United States Patent [19]
Scholder et al.

[11] Patent Number: 5,805,144
[45] Date of Patent: Sep. 8, 1998

[54] MOUSE POINTING DEVICE HAVING INTEGRATED TOUCHPAD

[75] Inventors: Erica J. Scholder; Clint H. O'Connor, both of Austin, Tex.

[73] Assignee: Dell USA, L.P., Austin, Tex.

[21] Appl. No.: 683,162

[22] Filed: Jul. 18, 1996

Related U.S. Application Data

[63] Continuation of Ser. No. 355,588, Dec. 14, 1994, abandoned.

[51] Int. Cl.⁶ ........................................................ G09G 5/08
[52] U.S. Cl. ............................................. 345/163; 345/173
[58] Field of Search .................................... 345/163, 164, 345/165, 173, 166, 167, 157, 156; 273/148 B; 74/474 XY; 178/18; 341/34

[56] References Cited

U.S. PATENT DOCUMENTS

| | | | |
|---|---|---|---|
| 4,913,573 | 4/1990 | Retter | 345/163 |
| 4,977,397 | 12/1990 | Kuo et al. | 345/163 |
| 5,049,863 | 9/1991 | Oka | 345/163 |
| 5,457,480 | 10/1995 | White | 345/163 |

*Primary Examiner*—Chanh Nguyen
*Attorney, Agent, or Firm*—Haynes & Boone, L.L.P.

[57] ABSTRACT

A mouse pointing device and a method of providing movement data and position data with a mouse pointing device. The device comprises: (1) a mouse body adapted to traverse a substantially planar surface, (2) a mouse movement tracking mechanism, coupled to the mouse body, for producing movement data regarding movement of the mouse body relative to the substantially planar surface and (3) a user position tracking mechanism, having a substantially planar mechanism surface occupying a portion of a surface of the mouse body, for producing contact data regarding contact between the mechanism surface and a user, the contact data including location data regarding a location of a contact point, on a plane of the mechanism surface, between the mechanism surface and the user.

28 Claims, 2 Drawing Sheets

MOUSE POINTING DEVICE HAVING INTEGRATED TOUCHPAD

This is a continuation of application Ser. No. 08/355,588 filed on Dec. 14, 1994, now abandoned.

TECHNICAL FIELD OF THE INVENTION

The present invention is directed, in general, to computer systems and, more specifically, to a mouse pointing device employed as an input device for a personal computer ("PC"). The mouse pointing device is equipped with a user position tracking mechanism, allowing the device to transmit smooth, analog-type data to the PC.

BACKGROUND OF THE INVENTION

Over the last several years, PCs have made more use of pointing devices such as trackballs, joysticks, touchpads (or digitizers), styli or mice to increase the useability of computer programs. In particular, computer programs employing graphical user interfaces ("GUIs"), such as Microsoft Windows, make extensive use of pointing devices to access program functions.

Trackballs are characterized by a substantially immobile base adapted to cradle a freely rotatable ball. The ball protrudes from a top surface of the base, allowing a user's palm or fingertips to rotate the ball. Rotation of the ball is translated into X-Y motion (a position parameter) of a pointer on a screen of the PC. Trackballs may be provided with one or more momentary buttons (switches having discrete on and off states) that the user may selectively depress to send commands to the PC.

Joysticks feature a more or less vertically-projecting arm that may be deflected in any direction from the vertical. The direction and degree of deflection determines the direction and distance a pointer is moved on the screen (again, a position parameter). Joysticks are also provided with momentary buttons that the user may selectively depress to send commands to the PC.

Touchpads are characterized by a substantially immobile base having a touch-sensitive membranous sensor pad located on a top surface thereof. When a user touches a portion of the pad, the portion either mechanically depresses or registers a change in temperature (effected by contact with the user) to sense the location on the pad the user has made contact. Circuitry within the touchpad translates the sensed location into a command to the PC, perhaps causing motion of a pointer (a position parameter) or effecting other, non-position parameter commands.

Some touchpads are pressure sensitive. That is, they are capable of providing a signal representative of the force that the user is bringing to bear on a portion of the touchpad. Still other touchpads are built integrally into the screen of the PC (so-called "touch-sensitive" screens). However, such touch-sensitive screens are relatively expensive and delicate and have enjoyed only limited applicability.

Stylus pointers are pen-like devices characterized by an elongated body in which is located a light sensor. When a user contacts the PC's screen, the light sensor produces a signal when the area of the screen beneath the pen is excited to produce light. Driver software within the PC can determine the location on the screen to which the pen is pointing by determining what area of the screen was excited at the time when the sensor generated the signal. Stylus pointers are not generally supplied with buttons, as they are often limited to entry of position parameters.

Of the above, however, the mouse has, over time, proven to be the fastest and most efficient pointing device in the PC environment. A mouse is characterized by a movable body that is adapted to traverse the surface of an underlying mousepad. A ball, captured in the body and slightly protruding from a bottom surface of the body, rolls along the surface as the body traverses the same. In a manner similar to that of the trackball, circuitry within the body translates ball rotation into X-Y coordinates employed to move a pointer about the screen. Mice are additionally equipped with one or more momentary buttons (again, switches having discrete on and off states) adapted to be selectively depressed by the user's manual digits.

Mice differ from the earlier-described pointing devices in two significant respects. First, a mouse uniquely allows a user to employ both finger and wrist action to "move," "click" and "drag" images about the screen. The user preferably employs the mouse by gripping the mouse under the palm of the user's hand and resting the fingers of the hand on the buttons. The user can thereby employ movement of the forearm or wrist to move the pointer about the screen, while the fingers can depress buttons to effect commands (clicking). By combining moving with constant button depression, one can drag, thereby combining position and non-position parameters. Second, a mouse can be lifted from the surface on which it moves to allow physical repositioning of the mouse without repositioning the pointer on the computer screen.

While one may move, click and drag with a trackball, movement of the ball causes displacement of the fingers from the buttons, thereby hampering the ability to drag. Touchpads do not employ forearm or wrist movement and thus are limited by the facility of the user's digits. Stylus pointers do not allow clicking, as they have no buttons.

Because of the uniquely ergonomic design of a mouse, it has become commonplace for desktop PCs to come equipped with a mouse. As advantageous as mice are, however, they are not universally the best input device for all applications. The other input devices described above still find particular use in some applications.

For instance, in graphic art design, multimedia and games, on-screen virtual slide-bars and virtual potentiometer-type controls may be required to be presented on the screen. This is because a mouse is unable to generate quantitative or analog-type commands via the buttons. In other words, given buttons having only discrete on and off states, the user is unable to generate commands such as "increase dithering somewhat," "make this more red" or "turn up the speaker volume a little." Touchpads, however, allow a user to enter such qualitative commands by providing software-configurable, dedicated areas thereon within which the user may slide a finger to generate an analog-type command.

Of course, the user could equip the PC with both a mouse and a touchpad, alternating between the two depending upon the application. However, most users are unwilling to dedicate the desktop space to accommodate both input devices. Further, the user must configure the PC to handle input from both of the devices, frequently requiring configuration of serial ports, a limited and sometimes frustrating resource in IBM-compatible PCs.

A means is needed to achieve smooth analog control of various program parameters under software control as required on demand. Such control may not be limited to an additional position parameter, but may include multiple positions, pressure or other information. Further, a means is needed to integrate this type of control into a standard input device, such that additional desktop space or re-programming of standard applications is not required.

Accordingly, what is needed in the art is an integrated mouse pointing device that contains a means by which a user may transmit analog-type information to a computer system.

SUMMARY OF THE INVENTION

To address the above-discussed deficiencies of the prior art, it is a primary object of the present invention to integrate the functions of a mouse pointing device and a touch-sensitive pad into a single, movable device, thereby allowing superior user control of a computer system.

In accordance with the above-defined primary object, the present invention provides a mouse pointing device and a method of providing movement data and position data with a mouse pointing device. The device comprises: (1) a mouse body adapted to traverse a substantially planar surface, (2) a mouse movement tracking mechanism, coupled to the mouse body, for producing movement data regarding movement of the mouse body relative to the substantially planar surface and (3) a user position tracking mechanism, having a substantially planar mechanism surface occupying a portion of a surface of the mouse body, for producing contact data regarding contact between the mechanism surface and a user, the contact data including location data regarding a location of a contact point, on a plane of the mechanism surface, between the mechanism surface and the user.

Thus, the present invention provides a mouse pointing device having an integral position tracking mechanism. By varying the contact point, the user can send controllable contact data to an associated computer system. This is in distinct contrast to the mouse pointing device of the prior art in which simple momentary switches are provided. The user has no control over contact points in such switches. Contact is either established (by depressing the switches) or not (by releasing the switches). Therefore, the user can send analog-type information (comprising degrees of control) rather than digital-type information (consisting of discrete off and on control).

Most often, the user contacts the mechanism surface with a digit of the user's hand, although it is within the scope of the present invention to locate the mechanism surface such that the user's palm or other body parts may contact the mechanism surface.

In a preferred embodiment of the present invention, the user position tracking mechanism includes a pressure-sensitive touch pad. The pressure-sensitive pad allows not only an indication of the location of the contact point, but also an indication of the degree of pressure that the user is placing on the touch-pad at the contact point. The ability to determine pressure is analogous to an accelerator (or "gas pedal") in an automobile. This allows for a third dimension of control, as a user can enter X-Y axis information by appropriately locating the contact point and Z axis information by varying pressure at the contact point. Of course, a simple touch-sensitive touchpad or a temperature-sensitive touch pad are also within the scope of the present invention.

In one embodiment of the present invention, the mechanism surface is substantially elongated. The location data therefore regards a linear location of the contact point on the plane of the mechanism surface. In this embodiment, the mechanism surface acts as a slide-bar. To control the slide-bar, the user simply moves the user's digit (or other appropriate part) along a length of the mechanism surface. Lateral movements of the digit may be ignored, as appropriate, to provide the linear location.

In a preferred embodiment of the present invention, the contact data further includes pressure data regarding a pressure at the contact point. As mentioned previously, a pressure-sensitive touchpad may be employed. Such pads produce pressure data. A temperature-sensitive pad may also be used to locate the body-temperatured part of the user contacting the mechanism surface.

In a preferred embodiment of the present invention, the device further comprises communication and control circuitry, contained within the mouse body, for transmitting the movement data and the contact data to an associated computer system. The communication and control circuitry collects movement and contact data from the mouse movement tracking mechanism and user position tracking mechanism and packages the data for transmission to the associated computer system. The communication and control circuitry may also receive commands from the associated computer system that establishes limited and enhanced operating modes of the mouse pointing device.

In a preferred embodiment of the present invention, the mechanism surface includes demarcations defining virtual buttons on the mechanism surface. The demarcations may take the form of painted or printed lines on the mechanism surface. When the user contacts a virtual button, the communication and control circuitry interprets the contact as a depression of the virtual button. The virtual buttons may act as momentary switches (either off or on) or pressure-sensitive switches (allowing a range of depression). It is also within the broad scope of the present invention to define virtual buttons without the benefit of demarcations, such that virtual buttons become completely configurable in software.

In a preferred embodiment of the present invention, the mechanism surface includes non-coplanar ridges defining regions in an area of the mechanism surface, the non-coplanar ridges producing a tactile indication of the regions to the user. The mechanism surface may therefore be divided into regions. Some of the regions may be elongated and function as slide-bars, as described above. Other regions may be designated as virtual buttons. Other regions may be defined as X-Y planes. The ridges serve as tactile cues for the user.

In a preferred embodiment of the present invention, the device further comprises a driver, executable in general purpose data processing and storage circuitry in an associated computer system, for receiving the movement and position data from the mouse pointing device, the driver making the movement and position data available to an application program executable on the general purpose data processing and storage circuitry. The driver is responsible for collecting data from the mouse and making the data available to application programs. In a manner to be described, computer systems provide standard function calls for application programs to allow the application programs to extract the data. The driver interfaces the standard function calls to the data supplied by the novel mouse pointing device of the present invention.

In a preferred embodiment of the present invention, the surface of the mouse body is an upper surface thereof. Thus, the mechanism surface is located on the top side of the mouse body and therefore replaces the prior art buttons. Those of ordinary skill in the art will see, however, that such mechanism surfaces may be placed on various other surfaces of the mouse body in an advantageous manner.

In a preferred embodiment of the present invention, communication and control circuitry within the mouse pointing device includes a limited operating mode in which the user position tracking mechanism is caused to function as a momentary switch. In computer systems employing a bidirectional link between the computer system and the mouse pointing device, the driver may command the mouse to enter the limited operating mode in which the user position tracking mechanism is caused to function as a momentary switch. This makes the mouse pointing device compatible with application programs that are designed to function with prior art mouse pointing devices.

In a preferred embodiment of the present invention, the mouse pointing device functions as a data input device for a PC. Those of skill in the art will realize, however, that the present invention may be advantageously employed with workstations and other suitable non-PC systems.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
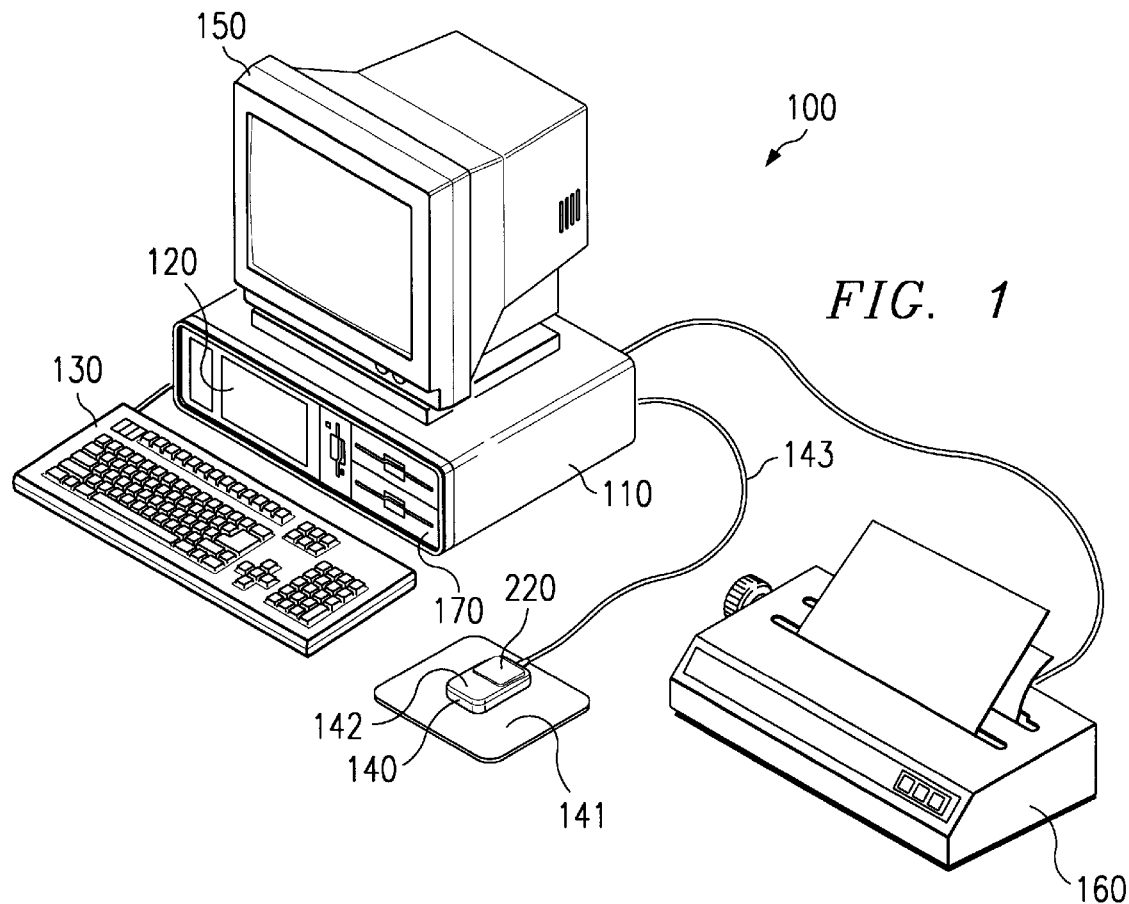
FIG. 1 illustrates an isometric view of a PC providing an environment within which the present invention can operate.

Referring initially to FIG. 1, illustrated is an isometric view of a PC providing an environment within which the present invention can operate. The PC 100 comprises a main chassis 110 containing computer system components to be illustrated and discussed in more detail with regard to FIG. 2. The main chassis 110 features, among other things, a reset button 120, a single pole momentary switch used to signal a CPU and other components (e.g., memory and input/output ("I/O") controllers not shown in FIG. 1) within the PC 100 to reboot, thereby providing a means of rebooting the PC 100. Coupled through individual connectors on the main chassis 110 are a keyboard 130, a mouse 140 and a video monitor 150 (constituting external data input and output devices).

The mouse 140 is adapted to traverse the surface of a mousepad 141. Further, a user can selectively enter information by placing pressure on an upper surface 142 of the mouse 140. Traversal of the mousepad 141 and pressure on the upper surface 142 generate control signals that travel through a mouse cord 143 to a mouse connector (not shown) on a rear side of the main chassis 110. Driver software executing within the main chassis 110 receives, modifies and stores the control signals for use by application programs.

A printer 160 is also shown coupled to a parallel port on a rear surface of the main chassis 110. The parallel port allows the PC 100 to send character or graphical data to the printer 160 for printing thereby. The peripheral devices 130, 140, 150, 160 allow the PC 100 to interact with a user. FIG. 1 also shows a disk drive 170, allowing permanent storage of computer system data on magnetic media.

Figure 2:
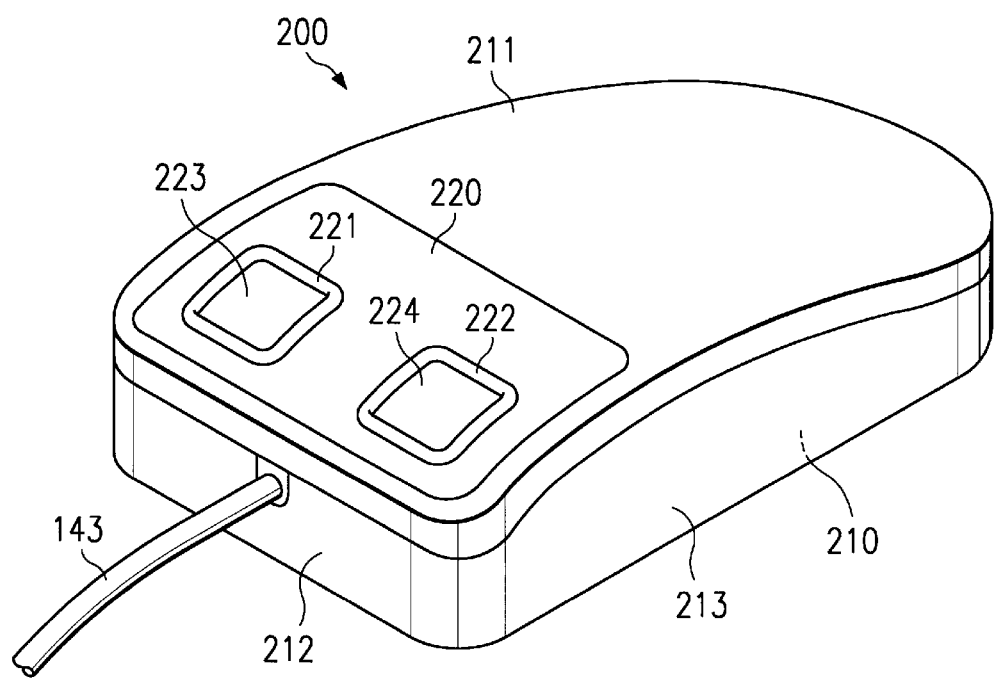
FIG. 2 illustrates an isometric view of the mouse pointing device of the present invention.

Turning now to FIG. 2, illustrated is an isometric view of the mouse pointing device of the present invention. The device, generally designated 200, comprises a mouse body 210 adapted to traverse a substantially planar surface. A mouse movement tracking mechanism (shown in FIG. 3) is coupled to the mouse body 210 and produces movement data regarding movement of the mouse body 210 relative to the substantially planar surface. A substantially planar mechanism surface 220 occupies a portion of a surface 211 of the mouse body 210. The mechanism surface 220 is a portion of a user position tracking mechanism (shown in FIG. 3). The mechanism surface 220 produces contact data regarding contact between the mechanism surface 220 and a user. The contact data includes location data regarding a location of a contact point, on a plane of the mechanism surface 220, between the mechanism surface 220 and the user.

More specifically, mechanism surface 220 is a pressure-sensitive touchpad. The pressure-sensitive pad allows not only an indication of the location of the contact point, but also an indication of the degree of pressure that the user is placing on the touchpad at the contact point. As previously stated, the ability to determine pressure is analogous to an accelerator (or "gas pedal") in an automobile. This allows for a third dimension of control, as a user can enter X-Y axis information by appropriately locating the contact point and Z axis information by varying pressure at the contact point.

The mechanism surface 220 includes demarcations 221, 222 defining virtual buttons 223, 224 on the mechanism surface 220. The demarcations 221, 222 may take the form of painted or printed lines on the mechanism surface 220. However, the demarcations 221, 222 take the form of non-coplanar ridges. The non-coplanar ridges produce a tactile indication of the regions to the user.

When the user contacts a virtual button 223, 224, communication and control circuitry within the mouse (and illustrated in FIG. 3) interprets the contact as a depression of the virtual button 223, 224. The virtual buttons 223, 224 may act as momentary switches (either off or on) or pressure-sensitive switches (allowing a range of depression and smooth analog control). As previously discussed, it is also contemplated that the virtual buttons 223, 224 may be defined without the benefit of demarcations 221, 222, such that the virtual buttons 223, 224 become completely configurable in software. However, as the demarcations 221, 222 benefit the user, the demarcations 221, 222 may be supplied on a template overlying the mechanism surface 220.

Demarcations may also be employed to define a substantially elongated portion of the mechanism surface 220. As such, the portion thereby defined may act as a slide-bar, allowing linear analog control of a parameter and replacing a corresponding slide-bar representation on the screen as the prior art would have required. To control the slide-bar, the user simply moves the user's digit along a length of the mechanism surface 220. Lateral movements of the digit may be ignored, as appropriate, to provide the linear location.

In the illustrated embodiment, the surface 211 of the mouse body 210 is an upper surface thereof. Thus, the mechanism surface 220 is located on the top side of the mouse body 210 and therefore replaces the prior art momentary buttons. Elongated mechanism surfaces (acting as slidebars) or virtual buttons may also be placed on side surfaces 212, 213 of the mouse body 210 to advantage. Those of skill in the art will recognize that multiple touchpads may be placed on the mouse body 210, perhaps corresponding to left, middle and right momentary buttons in a prior art mouse.

Figure 3:
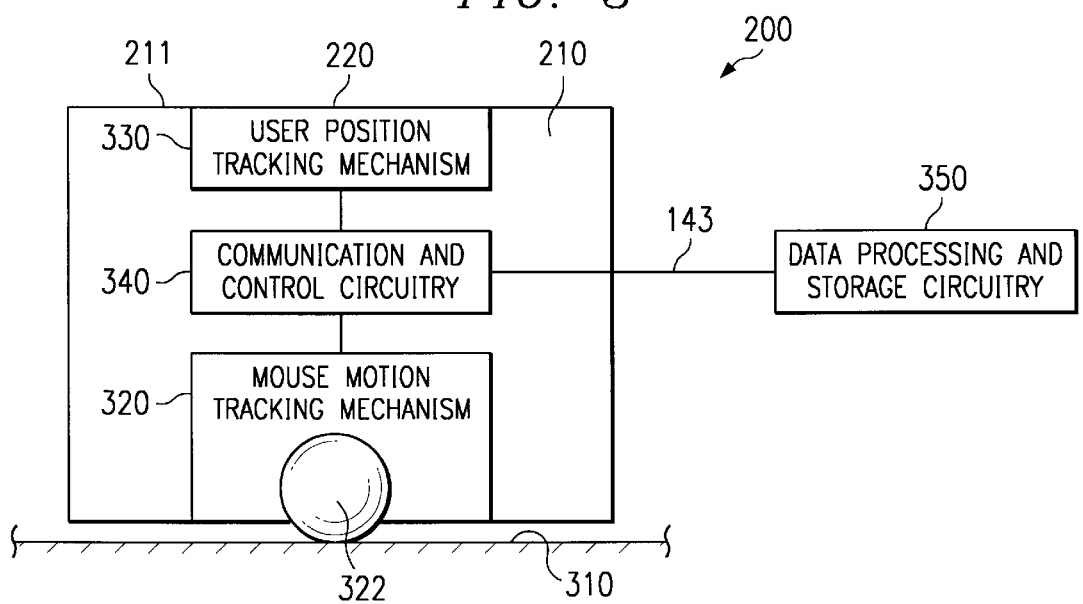
FIG. 3 illustrates a block diagram of the mouse pointing device of FIG. 2 and associated circuitry within the PC of FIG. 1.

Turning now to FIG. 3, illustrated is a block diagram of the mouse pointing device of FIG. 2 and associated circuitry within the PC of FIG. 1. Again, the mouse pointing device, generally designated 200, comprises a mouse body 210 adapted to traverse a substantially planar surface 310. A mouse movement tracking mechanism 320 comprising a rolling ball 322 is coupled to the mouse body 210 and transmits movement data regarding movement of the mouse body 210 relative to the substantially planar surface 310 to communication and control circuitry 340 located within the mouse body 210. A substantially planar mechanism surface 220 occupies a portion of a surface 211 of the mouse body 210. The mechanism surface 220 is a portion of the user position tracking mechanism 330. The user position tracking mechanism 330 transmits contact data regarding contact between the mechanism surface 220 and a user to the communication and control circuitry 340.

The communication and control circuitry 340 comprises temporary storage and serial transmission circuitry for sampling and holding the movement and contact data received from the mouse movement tracking mechanism 320 and the user position tracking mechanism 330, respectively. In the illustrated embodiment, the communication and control circuitry 340 transmits the data serially over a mouse cord 143 that typically contains power, ground, clock and data signals. The movement and contact data are preferably transmitted to the PC 100 of FIG. 1 using a serial protocol and encoding the data into the serial stream at rates ranging from 1200 bits per second (bps) to more than 9600 bps.

The data are transmitted to general purpose data processing and storage circuitry 350 within the main chassis 110 of FIG. 1. The circuitry 350 is adapted to execute a driver program designed to decode the serial stream received from the device 200 and make the movement and contact data available to application programs also executing in the circuitry 350.

The present invention implements an extended encoding format mimicking that of several mouse data transmission protocols but adds extra bytes representing the values of the digitized buttons. A mouse data packet according to the present invention comprises mouse button state information, X and Y counter information, contact position and pressure level and other state information. The button state information comes from a contact state (when the mechanism surface 220 is pressed) for resistive-type and other touch-type digitizers, or from a selectable force threshold for minimum button actuation force in the case of touchpads that measure multiple pressure or force levels. The digitized values of the button index (if more than one), contact position (which may be X only or X-Y) and pressure level (if available) are encoded and added to the data stream.

For a unidirectional data transfer protocol, a higher baud rate than 1200 bps may be required, as the mouse must transfer the entire extended mouse data packet continuously. The mouse driver is responsible for maintaining a standard mouse software interface until notified by an "aware" application that enhanced information is needed, at which time the extended information is made available to the application. If the mouse is used with standard mouse drivers, this may result in an incompatibility, as the driver must know how to handle the added data.

For a bidirectional data transfer protocol, certain mouse hardware states and operating parameters may be controlled by the driver. This is the preferred implementation, since until the enhanced mode is enabled, the enhanced mouse mimics the operation of a standard mouse. Once the extended mode is enabled, the added data are appended to the standard mouse data. The data transfer rate may need to be increased to over 1200 bps when the added data are included.

Again, the driver on the PC side is responsible for providing the extended mouse interface application programming information ("API"). It provides the standard mouse programming interface for the target operating system and hardware environment. For an IBM PC-class computer, the accepted interface is through Intel microprocessor registers via interrupt #51 (33h). Extended function calls are made available to extract the additional information. The "aware" application programs use these calls.

Thus, in the illustrated embodiment, the mouse cord 143 provides a bidirectional link between the communication and control circuitry 340 and the general purpose data processing and storage circuitry 350. The communication and control circuitry 340 within the mouse pointing device 200 includes a limited operating mode in which the user position tracking mechanism 330 is caused to function as a momentary switch. The driver thus may command the mouse to enter the limited operating mode in which the user position tracking mechanism 330 is caused to function as a momentary switch.

This makes the mouse pointing device compatible with application programs that are designed to function with prior art mouse pointing devices, since the added data introduced by the present invention would not be needed. In fact, in the illustrated embodiment, the mouse is placed in the limited operating mode upon initial power-up and later released from the limited mode and into the enhanced mode when the more advanced data features are required.

Figure 4:
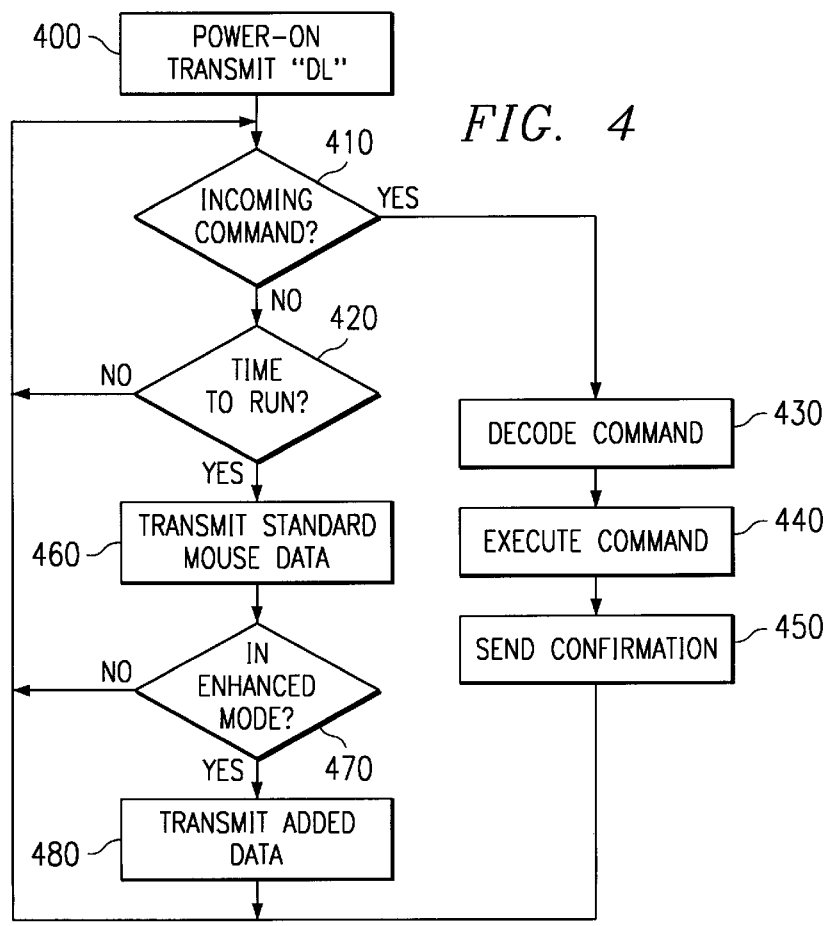
FIG. 4 illustrates a flow diagram of a method of encoding data transmitted from the mouse pointing device of FIG. 2.

Turning now to FIG. 4, illustrated is a flow diagram of a method of encoding data received from the mouse pointing device of FIG. 2. The method begins in a step 400 when a power-on reset signal transmits a "DL" code to the mouse. This preferably causes the mouse to enter the limited mode of operation.

In a decisional step 410, it is determined whether a command is incoming from the driver. If a command is not incoming, execution proceeds to a decisional step 420, wherein it is decided whether or not to run (send data). If, instead, a command is incoming from the driver (again, in the decisional step 410), execution proceeds to a decode command step 430, wherein the command is decoded. Next, the command is executed (in a step 440) and the mouse reconfigured and a confirmation is given to the driver (in a step 450).

If it is time to run (again, in the decisional step 420), execution proceeds to a step 460 wherein standard mouse data are transmitted to the driver. Next, in a decisional step 470, it is decided whether the mouse has been placed in its enhanced mode. If so, execution proceeds to a step 480, wherein the added data are also transmitted to the driver. If it is not time to run (a negative result in the decisional step 420), if only standard data are transmitted (a negative result in the decisional step 470), if confirmation of an incoming command has been sent (the step 450) or the added data are transmitted (the step 480), execution returns to the step 410.

The mouse data packet, if based upon the Microsoft Mouse Protocol and assuming three separate touchpads or portions of a single touchpad (arranged as left L, middle M and right R), is structured as follows:

| Byte | Content |
|------|---------|
| 1 | Sign Bits, L/M/R button states |
| 2 | Relative X count since last position report |
| 3 | Relative Y count since last position report |
| 4 | L touchpad contact position (0–255) |
| 5 | M touchpad contact position (0–255) |
| 6 | R touchpad contact position (0–255) |
| 7 | L touchpad contact pressure (0–255) |
| 8 | M touchpad contact pressure (0–255) |
| 9 | R touchpad contact pressure (0–255) |

From the above description, it is apparent that the present invention provides a mouse pointing device and a method of providing movement data and position data with a mouse pointing device. The device comprises: (1) a mouse body adapted to traverse a substantially planar surface, (2) a mouse movement tracking mechanism, coupled to the mouse body, for producing movement data regarding movement of the mouse body relative to the substantially planar surface and (3) a user position tracking mechanism, having a substantially planar mechanism surface occupying a portion of a surface of the mouse body, for producing contact data regarding contact between the mechanism surface and a user, the contact data including location data regarding a location of a contact point, on a plane of the mechanism surface, between the mechanism surface and the user.

Although the present invention and its advantages have been described in detail, it should be understood that various changes, substitutions and alterations can be made herein without departing from the spirit and scope of the invention in its broadest form.

What is claimed is:

1. A mouse pointing device comprising:
   a mouse body moveable over a substantially planar surface;
   a mouse movement tracking mechanism, coupled to said mouse body, for producing movement data regarding movement of said mouse body relative to said substantially planar surface; and
   a user position tracking mechanism, having a pressure-sensitive touchpad occupying a portion of a surface of said mouse body, for producing contact data regarding contact between said touchpad and a user, said contact data including location data regarding a location of a contact point, between said touchpad and said user, said touchpad including demarcations defining virtual buttons on said touchpad for use in a graphical user interface mode, said mouse movement tracking mechanism and said user position tracking mechanism configured such that a user need not take action to disable one of said tracking mechanisms in order to for said user to use the other one of said tracking mechanisms.

2. The device as recited in claim 1 wherein said touchpad is substantially elongated, said location data regarding a linear location of said contact point on said plane of said touchpad.

3. The device as recited in claim 1 wherein said contact data further includes pressure data regarding a pressure at said contact point.

4. The device as recited in claim 1 further comprising communication and control circuitry, contained within said mouse body, for transmitting said movement data and said contact data to an associated computer system.

5. The device as recited in claim 1 wherein said touchpad includes non-coplanar ridges defining regions in an area of said touchpad, said non-coplanar ridges producing a tactile indication of said regions to said user.

6. The device as recited in claim 1 further comprising a driver, executable in general purpose data processing and storage circuitry in an associated computer system, for receiving said movement and position data from said mouse pointing device, said driver making said movement and position data available to an application program executable on said general purpose data processing and storage circuitry.

7. The device as recited in claim 1 wherein said surface of said mouse body is an upper surface thereof.

8. The device as recited in claim 1 wherein communication and control circuitry within said mouse pointing device includes a limited operating mode in which said user position tracking mechanism is caused to function as a momentary switch.

9. A method of providing movement data and position data with a mouse pointing device, comprising the steps of:
   traversing a substantially planar surface with a mouse body of said mouse pointing device;
   producing movement data with a mouse movement tracking mechanism coupled to said mouse body, said movement data regarding movement of said mouse body relative to said substantially planar surface; and
   producing contact data with a user position tracking mechanism having a substantially planar pressure-sensitive touchpad occupying a portion of a surface of said mouse body, said contact data regarding contact between said touchpad and a user, said contact data including location data regarding a location of a contact point, between said touchpad and said user, said touchpad including demarcations defining virtual buttons on said touchpad for use in a graphical user interface mode, said mouse movement tracking mechanism and said user position tracking mechanism configured such that a user need not take action to disable one of said tracking mechanisms in order to for said user to use the other one of said tracking mechanisms.

10. The method as recited in claim 9 wherein said step of producing said contact data comprises the step of producing location data regarding a linear location of said contact point on said plane of said touchpad, said touchpad being substantially elongated.

11. The method as recited in claim 9 wherein said step of producing said contact data comprises the step of producing pressure data regarding a pressure at said contact point.

12. The method as recited in claim 9 further comprising the step of transmitting said movement data and said contact data to an associated computer system with communication and control circuitry contained within said mouse body.

13. The method as recited in claim 9 further comprising the step of defining regions in an area of said mechanism surface with non-coplanar ridges on said mechanism surface, said non-coplanar ridges producing a tactile indication of said regions to said user.

14. The method as recited in claim 9 further comprising the step of receiving said movement and position data from said mouse pointing device into a driver executable in general purpose data processing and storage circuitry in an associated computer system, said driver making said movement and position data available to an application program executable on said general purpose data processing and storage circuitry.

15. The method as recited in claim 9 wherein said step of producing said contact data comprises the step of applying force to said user position tracking mechanism, said user position tracking mechanism occupying a portion of an upper surface of said mouse body.

16. The method as recited in claim 9 further comprising the step of causing said user position tracking mechanism to function as a momentary switch.

17. A mouse pointing device comprising:
  a mouse body moveable over a substantially planar surface;
  a mouse movement tracking mechanism, coupled to said mouse body, for producing movement data regarding movement of said mouse body relative to said substantially planar surface; and
  a user position tracking mechanism, including a pressure-sensitive touchpad occupying a portion of a surface of said mouse body, for producing contact data regarding contact between said mechanism surface and a user, said contact data including location data regarding a location of a contact point, between said touchpad and said user, said touchpad including demarcations defining virtual buttons on said touchpad for use in a graphical user interface mode;
  communication and control circuitry, contained within said mouse body, for transmitting said movement data and said contact data to an associated computer system; and
  a driver, executable in general purpose data processing and storage circuitry in said associated computer system, for receiving said movement and position data from said communication and control circuitry, said driver making said movement and position data available to an application program executable on said general purpose data processing and storage circuitry.

18. The device as recited in claim 17 wherein said mechanism surface is substantially elongated, said location data regarding a linear location of said contact point on said plane of said mechanism surface.

19. The device as recited in claim 17 wherein said contact data further includes pressure data regarding a pressure at said contact point.

20. The device as recited in claim 17, wherein said mechanism surface includes non-coplanar ridges defining regions in an area of said mechanism surface, said non-coplanar ridges producing a tactile indication of said regions to said user.

21. The device as recited in claim 17 wherein said surface of said mouse body is an upper surface thereof.

22. The device as recited in claim 17 wherein said communication and control circuitry includes a limited operating mode in which said user position tracking mechanism is caused to function as a momentary switch.

23. A method of providing movement data and position data with a mouse pointing device, comprising the steps of:
  traversing a substantially planar surface with a mouse body of said mouse pointing device;
  producing movement data with a mouse movement tracking mechanism coupled to said mouse body, said movement data regarding movement of said mouse body relative to said substantially planar surface; and
  producing contact data with a user position tracking mechanism including a pressure-sensitive touchpad occupying a portion of a surface of said mouse body, said contact data regarding contact between said mechanism surface and a user, said contact data including location data regarding a location of a contact point, between said touchpad and said user, said touchpad including demarcations defining virtual buttons on said touchpad for use in a graphical user interface mode;
  transmitting said movement data and said contact data to an associated computer system with communication and control circuitry contained within said mouse body; and
  receiving said movement and position data from said communication and control circuitry into a driver, executable on said general purpose data processing and storage circuitry in said associated computer system, said driver making said movement and position data available to an application program executable on said general purpose data processing and storage circuitry.

24. The device as recited in claim 23 wherein said step of producing said contact data comprises the step of producing location data regarding a linear location of said contact point on said plane of said mechanism surface, said mechanism surface being substantially elongated.

25. The device as recited in claim 23 wherein said step of producing said contact data comprises the step of producing pressure data regarding a pressure at said contact point.

26. The device as recited in claim 23 further comprising the step of defining regions in an area of said mechanism surface with non-coplanar ridges on said mechanism surface, said non-coplanar ridges producing a tactile indication of said regions to said user.

27. The device as recited in claim 23 wherein said step of producing said contact data comprises the step of applying force to said user position tracking mechanism, said user position tracking mechanism occupying a portion of an upper surface of said mouse body.

28. The device as recited in claim 23 further comprising the step of causing said user position tracking mechanism to function as a momentary switch.

* * * * *